Oct. 17, 1939.

B. O. BAIRD ET AL 2,176,288

HAND MEASURING INSTRUMENT

Original Filed Dec. 26, 1934 2 Sheets-Sheet 1

Oct. 17, 1939.  B. O. BAIRD ET AL  2,176,288
HAND MEASURING INSTRUMENT
Original Filed Dec. 26, 1934   2 Sheets-Sheet 2
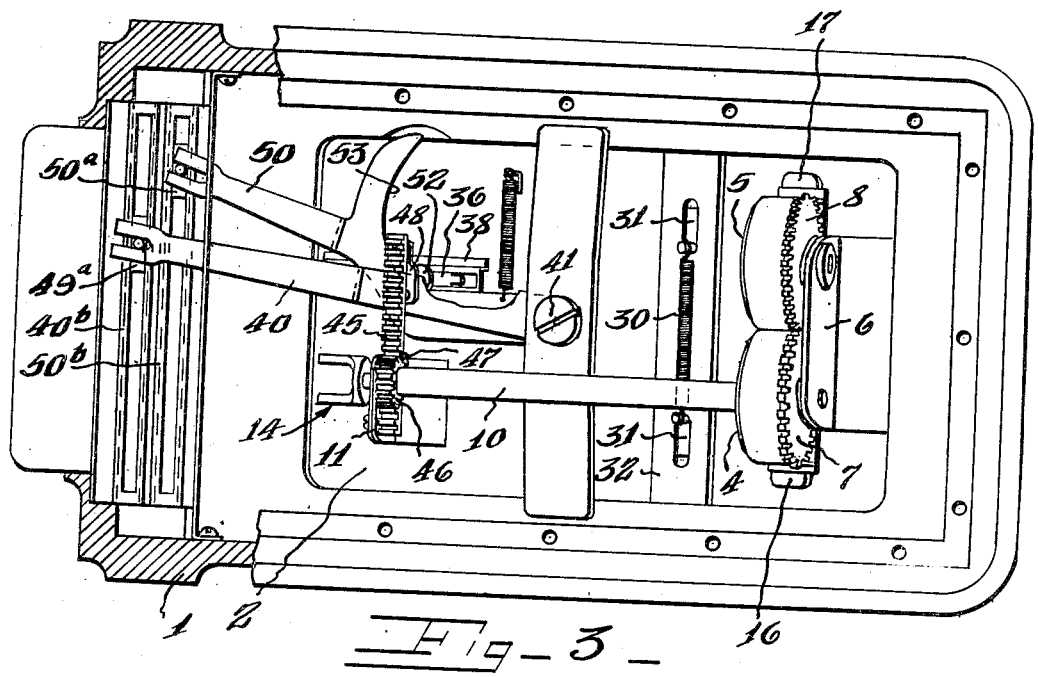
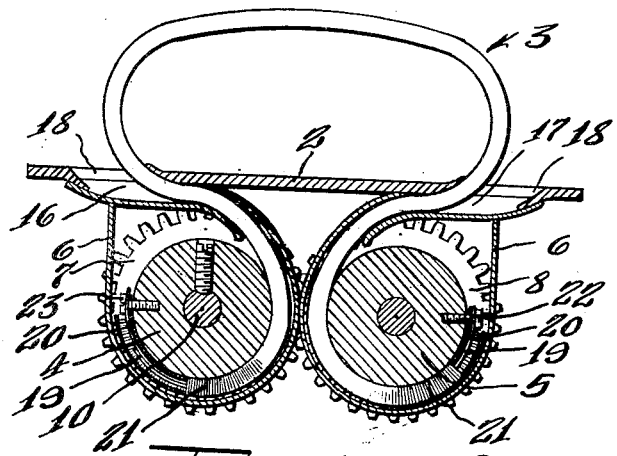

Patented Oct. 17, 1939

2,176,288

UNITED STATES PATENT OFFICE 2,176,288

HAND MEASURING INSTRUMENT

Bernard O. Baird and Kenneth H. Bowen, Auburn, and Adam C. Davis, Jr., Ithaca, N. Y., assignors to Gates-Mills Inc., Johnstown, N. Y., a corporation of New York Application December 26, 1934, Serial No. 759,198
Renewed May 4, 1938

14 Claims. (Cl. 33—2)

This invention relates to hand measuring instruments for determining quickly and accurately the size of the glove required and has for its object an instrument embodying a tape supported in the form of a loop to receive the hand together with mechanism for contracting the loop to conform with the hand, which mechanism pulls on the tape in opposite directions to contract the loop and pushes on the end portion of the tape to expand the loop.

It further has for its object a tape of such construction that it conforms accurately to the contour of the hand and is of sufficient rigidity to stand in the form of a loop and of sufficient flexibility or conformability to closely conform to the contour of the hand.

It further has for its object a tape construction which includes a laminated ribbon with the laminations capable of slipping relative to each other when the loop is being expanded or contracted and also a tape including a ribbon which is enclosed in a flexible or elastic sleeve or wrapper, that is, a tape consisting of a flexible inelastic ribbon or ribbons and a flexible and elastic wrapper.

It further has for its object a tape construction and operating mechanism therefor including spools arranged parallel to each other on which opposite end portions of the tape wind in opposite directions, the tape including a laminated ribbon, one lamination of which is anchored to one spool only and the other lamination to both spools, and also such a laminated ribbon enclosed in a flexible and elastic sleeve having its ends secured to both spools.

It further has for its object a hand measuring instrument embodying a hand rest with means for locating the hand on the rest with the hand in juxtaposition to the measuring instrumentality and a finger abutment located to be engaged and shifted by the end of the longest finger of the hand, as the second finger, when the hand is located on the hand rest, together with means for indicating in terms of glove sizes the movements of the measuring instrumentality and the abutment.

It also has for its object indicators for translating the movement of the tape and the finger abutment into terms of glove sizes and multiplying the movement of the tape and abutment so that the calibrations on the scales along which the indicators move are easily read.

It further has for its object the general arrangement of the looped tape for measuring the hand, the hand rest, the finger abutment and the indicators and scales on a base, or the general arrangement of the mechanism and parts, on a suitable base designed to set on the glove counter so as to be readily accessible to customers in front of the counter with the scales visible to the clerk back of the counter.

Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 3 is an inverted plan view, partly in section, the bottom plate being removed.

Figure 4 is a sectional view on line 4—4, Figure 2.

Figure 2:
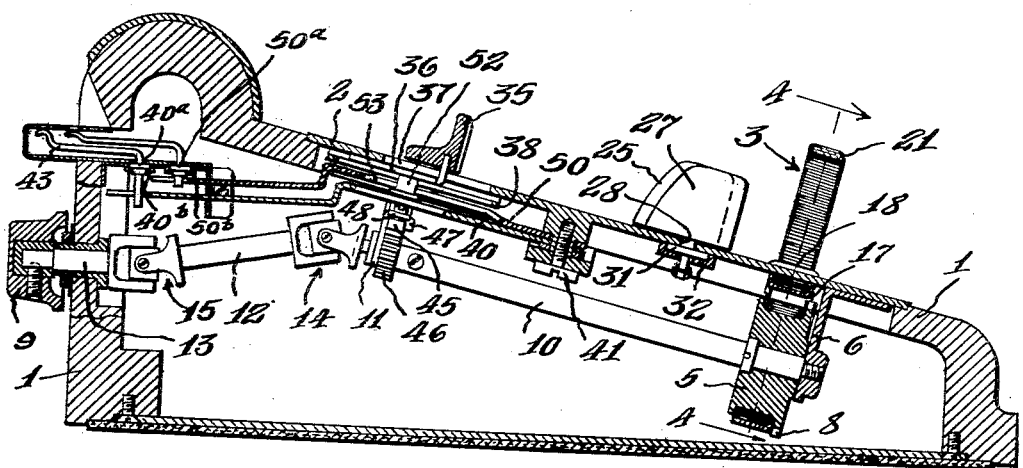
Figure 2 is a longitudinal sectional view taken on line 2—2, Figure 1.
Figure 1:
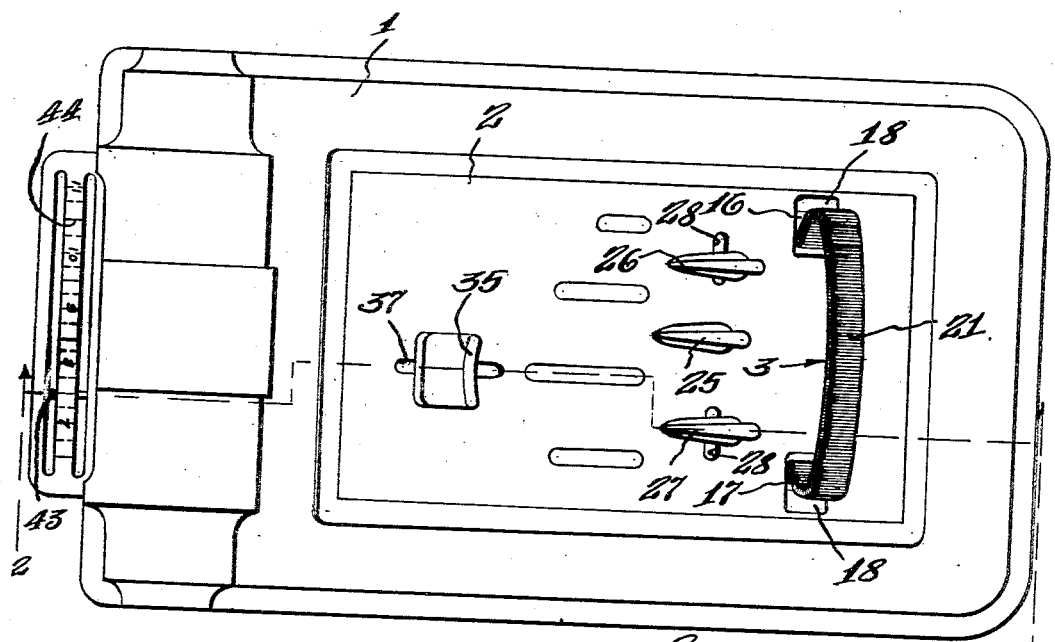
Figure 1 is a plan view of this hand measuring instrument.

This glove measuring instrument comprises, generally, a suitable base having a hand rest on the upper side thereof, a tape projecting through the hand rest through suitable slots and taking the form of a loop, mechanism within the base below the hand rest for expanding and contracting the loop on the hand, including an operating handle located outside the base, an indicator movable over a suitable scale remote from the loop and adjacent the handle for indicating in terms of glove sizes, the movement of the tape, means for accurately locating the hand on the hand rest, a finger abutment mounted on the hand rest to be shifted thereby by the longest finger of the hand, as the second finger, as the hand is being located on the hand rest and indicator mechanism operated by the movable abutment and located adjacent the former scale. As to certain phases of the invention, some of the foregoing mechanism may be omitted.

1 designates the base or case which may be of any suitable form, size and construction, it being boxlike in form and provided with a top wall having an opening, which is covered by a removable plate 2 which forms the hand rest. The operating mechanisms for the measuring instrumentalities are supported within the case 1 from the plate 2.

3 designates a tape taking the form of a loop above the hand rest 2, the loop being for the purpose of receiving the hand to accurately conform to the back and the sides of the hand in a widthwise direction. The loop is expansible and contractile. The tape is constructed to be flexible and conformable to the hand and of sufficient rigidity to stand in the form of a loop, particularly a flattened or oblong loop with the end portions of the loop extending inwardly along one side of the oblong formation, that is, inwardly under the hand and the hand rest in a general direction parallel to the hand rest, so that the end portions of the loop move laterally relatively to the hand when being expanded or contracted. This lateral movement and the means by which it is effected forms an important feature of the invention.

The operating mechanism therefor includes a pair of spools 4, 5, arranged parallel to each other and supported in housings or brackets 6 suspended from the plate 2. The spools 4, 5, are arranged close together, and are also geared together as by intermeshing gear rings 7 and 8. One of the spools is actuated by hand operating mechanism from a handle or knob 9 located outside of the case and connected to the spool through a shaft 10 mounted at one end in the spool 4 and in the bracket 6, and at its other end in a suitable bearing 11 suspended from the top plate 2, and also through a shaft 12 connecting the stud 13 of the knob or handle 9 and the shaft 10, the shaft 12 being connected to these parts by universal joints 14, 15. The stud 13 is suitably mounted in an end wall of the case 1.

The tape 3 is so constructed as to be flexible enough to closely conform to the contour of the back and sides of the hand, and also rigid enough to maintain the loop without collapsing in order that the hand may be readily inserted through the loop, and the opposite end portions wind on the spools 4, 5, in opposite directions, so that upon turning of the shaft 10 in one direction, the tape is expanded by a pushing force, and upon turning of the shaft in the opposite direction, the tape winds on the spools with a pulling force applied to both ends of the tape 3. Means is provided for preventing binding or buckling tendencies of the tape when the pushing force is being applied, and as here illustrated, tubular guides 16, 17 conforming to the flat contour of the tape, are provided, rigid with the bracket 6 and adjacent the spools, these guides extending in general tangential directions to the spools. The guides open through the top plate 2 at 18. The tape slidably fits the guides. The guides 16, 17 extend upwardly and outwardly under the hand rest and their end portions extend in a general direction parallel to the hand rest and open through the hand rest through slots. The guides, owing to their arrangement, cause the flexible and conformable oblong loop to expand and contract laterally as well as vertically, and hence, to conform accurately to the contour of the hand, both as to width and thickness. It will be understood that the width measurement of the hand includes both the width and the thickness of the hand.

The tape is formed of an inner flexible and inelastic element or member and an outer elastic covering or sleeve, and in the illustrated embodiment of this tape, it comprises a laminated ribbon, the laminations of which are capable of slipping relatively to each other during the winding and unwinding of the tape, one ribbon being anchored to one spool only, and the other ribbon to both spools. Also, the laminated ribbon is enclosed in the outer flexible elastic wrapper conforming thereto which is anchored at its ends to both spools, this elastic sleeve or wrapper being usually composed of spirally wound wire.

The laminations constitute one form of the inner element or member and the sleeve the outer elastic wrapper.

The numeral 19 designates one of the laminations of the ribbon; the numeral 20 the other; and 21 the flexible elastic sleeve wrapper. The laminations 19, 20 and sleeve 21 are here shown as anchored to one spool by a single fastening member, as a screw 22, while the ribbon 20 and the sleeve wrapper 21 are secured to the other spool 5 by a similar fastening member 23, the ribbon 19 being unsecured to the spool 5. Owing to this construction, the tape is flexible to accurately conform to the contour of the hand and to wind on the spools 4, 5, at the same time in opposite directions, and is rigid enough to maintain the loop against collapsing. The laminations 19 and 20 and also the sleeve are free to slip slightly during expansion and contraction of the loop. The elastic sleeve is in a sense another lamination or laminations.

The means for locating the hand on the hand rest, or plate 2, includes an abutment 25 projecting upwardly from the base plate and fixed thereto and located to enter the interstice between the second and third fingers of the hand, and to bottom against the inner end of the interstice when the hand is located on the hand rest 2. This abutment 25 is made as thin, flat and smooth as possible to conform to the fingers without obstructing the passage of the fingers past the abutment. The locating means also includes additional abutments 26, 27, for entering the interstices between the first and second fingers, and between the third and fourth fingers. As the width of hands vary, these abutments 26 and 27 are mounted to shift laterally rectilinearly against spring reaction tending to return them to a starting position, and as here shown, they are provided with stems extending through transverse slots 28 in the plate 2, the stems being connected together by a tension spring 30. As here shown, in order to hold the abutments from twisting movement, these stems are provided with heads 31 movable in guides 32 on the under side of the plate 2. These abutments 26 and 27 are also thin and flat and shaped to coact with the fingers without binding or twisting.

35 designates a finger abutment for coacting with the longest finger, as the second finger of the hand, this coacting with the end of the finger and shiftable in a direction lengthwise of the hand rest 2. It is here shown as including a slide 36 extending through a guide slot 37 in the plate, and movable along a suitable guide 38 on the lower side of the base plate. The indicating mechanism for showing in terms of glove sizes, the movement of the tape 3 is operated from the operating mechanism for the spools 4, 5, and it is here shown as operated from the shaft 10. It includes a member 50 consisting of a lever pivoted at 41 to a suitable bracket within the case on the under side of the plate 2, and as extending toward the end wall of the case remote from the tape 3, and coacting with a pointer 43 movable along a scale 44 on the outside of the case.

The lever 40 is connected to the shaft 10 through a rectilinearly slidable rack 45 meshing with a pinion 46 on the shaft 10, the rack being suitably guided rectilinearly in a guide 47 provided on the bearing bracket 11. The rack is connected to the lever in order to compensate for the arcuate movement of the lever through a joint having a compensating action, the joint here shown being a link 48 pivoted at one end to the lever, and at its other end to the rack. This motion transmitting mechanism multiplies and transmits the motion of the shaft 10 so that the calibrations of the scale can be placed reasonably far enough apart to be easily read in contradistinction to being confined to a small area.

The means for indicating the length size operated by the abutment 35, as here shown, includes a spring pressed lever 50 pivoted at 41 to the under side of the plate and coacting with the slide of the abutment 35 through means tending to translate the rectilinear movement of the finger abutment 35 into an arcuate movement.

As here illustrated, the stem of the abutment 35 is provided with a follower 52 coacting with a cam 53 on the lever 50. Both the indicator levers 40, 50 coact with indicators 40a, 50a, which are here illustrated as slides, having pointers movable over scales on the end wall of the casing in which the handle 9 is mounted. The indicators 40a, 50a, move along suitable guides 40b, 50b, within the case. The indicator lever 40 operated by the shaft 10 indicates the size of the glove, as to the width and thickness of the hand, and the indicator lever 50 operated by the finger abutment 35 indicates the size of the glove in regard to length, as long, short, or medium. The instrument is adapted for measuring adult sized hands, and that here shown, for measuring the right hand.

In operation, the right hand is placed on the hand rest through the loop 3 with the locating abutment 25 between the second and third fingers, and the shiftable abutments 26 and 27 between the third and fourth fingers, and between the first and second fingers, but with the abutment 25 bottoming at the inner end of the interstice between the second and third fingers. When the hand is thus located, the second finger operates the abutment 35 which causes its indicator to show on its scale whether a long, short, or medium glove is required. The knob 9 is turned to contract the tape 3 on the hand, and during this operation, the indicator is correspondingly moved over its scale to show the glove size as 7, 7¼, 7½, etc. Ordinarily, the length indicator points on the same scale as the width indicator, and the width indicator indicates the hand size and if the finger length indicator indicates on the same scale, the same size, then an average or medium globe is supplied. If, for instance, the width indicator indicates 7, and the finger length indicator indicates greater than 7, a number 7 glove long is supplied. If the finger length indicator points out less than 7, number 7 glove with short fingers is supplied.

Owing to the construction and operation of the tape, and the operation of the tape from both ends thereof, the tape accurately and closely conforms to the contour of the hand both as to width and thickness, and the size of the glove required accurately indicated. Also, the length of the glove is accurately indicated by the abutment 35 through the motion transmitting and multiplying indicator mechanism. Owing to the relative location of the hand rest, tape 3 and scales, this instrument can be placed on a counter with the loop toward the customer's side of the counter, so that the hand rest is readily accessible to the customer and at the same time, the reading can be taken by the clerk on the other side of the counter. The accurate measuring of the width of the hand is also facilitated by the shiftable abutments 26 and 27 which cause the hand to be properly placed or spread on the flat hand rest.

It will be apparent that certain features of this invention, particularly the tape construction is equally adapted to instruments other than hand measuring instruments, as for instance, foot measuring devices.

What we claim is:

1. In a measuring instrument, a flexible conformable tape, means for holding the intermediate portion of the tape in the form of a loop, oblong in general form, with the end portions of the loop extending inwardly along one side of the oblong formation, rotary means on which wind the portions of the tape which are continuous of the end portions of the loop, means for operating said rotary means, and guides in which the end portions of the tape continuous of the end portions of the loop slidably fit for causing the end portions of the loop to expand and contract laterally during the operation of said rotary means, the guides extending from the end portions of the loop toward the rotary means and being substantially tangential to the rotary means.

2. A hand measuring instrument including a flexible conformable tape consisting of laminations, means for holding the tape in the form of a loop to receive the hand including a pair of spools on which opposite end portions of the tape wind, one of said laminations being anchored to one spool only.

3. A hand measuring instrument including a flexible tape consisting of laminations, means for holding the tape in the form of a loop to receive the hand including a pair of spools on which opposite end portions of the tape wind, one lamination being anchored to one spool only, and the other lamination being anchored at its ends to both spools, and means for turning the spools.

4. In a hand measuring instrument, a tape, and spools on which opposite end portions of the tape wind, and arranged to maintain the portion of the tape between the spools in the form of a loop for receiving the hand, said tape including an inner inelastic member winding on the spools, and an outer flexible, elastic sleeve enclosing said member.

5. In a hand measuring instrument, a tape, and spools on which opposite end portions of the tape wind, and arranged to maintain the portion of the tape between the spools in the form of a loop for receiving the hand, said tape including a ribbon winding on the spools, and an outer flexible, elastic sleeve enclosing the ribbon, the elastic sleeve being secured at its ends to the spools, and means for turning the spools.

6. In a hand measuring instrument, a tape, and spools on which opposite end portions of the tape wind, the spools being arranged to hold the portions of the tape between the spools in the form of a loop for receiving a hand, said tape comprising a laminated ribbon, one lamination being secured at opposite ends to both spools, and the other lamination being anchored to one spool only, and an elastic, flexible sleeve enclosing the ribbon and winding on both spools, and means for turning the spools.

7. In a hand measuring instrument, a tape, and spools on which opposite ends of the tape wind, the spools being arranged to hold the portions of the tape between the spools in the form of a loop for receiving a hand, said tape comprising a laminated ribbon, one lamination being secured at opposite ends to both spools, and the other lamination being anchored to one spool only, and an elastic, flexible sleeve enclosing the ribbon and winding on both spools, the elastic sleeve being secured at its opposite ends to the spools.

8. In a hand measuring instrument, a suitable base having a substantially flat top constituting a hand rest, means for locating the hand on the rest, means including a flexible conformable tape in the form of a loop projecting through the hand rest for measuring the width of the hand when the hand is located on the hand rest, means located within the base for operating the tape to expand and contract the loop to conform to the contour of the hand, a scale located remote from the loop, an indicator movable over the scale, motion transmitting means between the operating means and the indicator to move the same over the scale in accordance with the movement of the loop, the operating means having a handle located adjacent the scale.

9. In a hand measuring instrument, a suitable base having a hand rest on the top side thereof, a pair of spools mounted in the base below the hand rest, a flexible conformable tape constructed to take the form of an oblong loop having its opposite end portions on one side of the oblong formation extending in a general direction parallel to the hand rest and extending through the hand rest, the end portions of the tape continuous of the loop winding on the spools respectively, guides for the tape extending in a general direction tangential relative to the spools and opening through the hand rest, the portions of the guides in which the ends of the loop are located extending substantially parallel to the hand rest and opening therethrough, the tape slidably fitting the guides and operating means for the spools.

10. In a hand measuring instrument, a suitable base having a hand rest on the top side thereof, means extending through the hand rest for measuring the hand, operating means therefor located within the base and having a handle located outside the base, a scale on the base remote from the hand measuring means, an indicator movable over the scale, motion transmitting and multiplying means between the operating means and the indicator, the operating means including a rotatable shaft and the motion and multiplying means, a lever carrying the indicator at the free end thereof, a pinion carried by the shaft and a rectilinearly guided rack meshing with the pinion carried by the lever, there being a connection between the rack and the lever to compensate for the arcuate movement of the lever relatively to the rack.

11. In a hand measuring instrument, a suitable base having a hand rest on the top side thereof, means extending through the hand rest for measuring the hand, operating means therefor located within the base and having a handle located outside the base, a scale on the base remote from the hand measuring means, an indicator movable over the scale, motion transmitting and multiplying means between the operating means and the indicator, the operating means including a rotatable shaft and the motion and multiplying means, a lever carrying the indicator at the free end thereof, a pinion carried by the shaft and a rectilinearly movable rack meshing with the pinion carried by the lever, there being a connection between the rack and the lever to compensate for the arcuate movement of the lever relatively to the rack, said compensating connection comprising a link pivotally connected to the rack and to the lever.

12. In a hand measuring instrument, a suitable base having a hand rest on the top side thereof, means for measuring the width of the hand, a movable abutment on the hand rest arranged to be operated by the second finger of the hand, means operable by the abutment for indicating the finger length and means for locating the hand on the rest, the locating means including an abutment for entering the interstice between the second and third fingers and coacting with the hand at the inner end of said interstice, and further including laterally shiftable spring-pressed abutments on the hand rest and arranged to enter interstices between the other fingers of the hand.

13. In a hand measuring instrument, a suitable base having a hand rest on the top side thereof, means for locating the hand on the abutment, means including a flexible tape in the form of a loop projecting through the hand rest for receiving the hand and measuring the width of the hand when the hand is located on the hand rest, means located within the base for operating the tape to expand and contract the loop to conform to the contour of the hand and a handle for said means located outside the base at the end of the base remote from the loop, a scale located at said end of the base adjacent the handle, an indicator movable over the scale, motion transmitting means between the operating means and the indicator to move the indicator over the scale in accordance with the movement of the loop, a movable abutment on the hand rest arranged to engage the longest finger of the hand and to be shifted when the hand is located on the hand rest, a second scale located at the end of the base adjacent the former scale, a second indicator movable over the second scale, motion transmitting means within the base, between the finger abutment and the second indicator.

14. In a hand measuring instrument, a tape, and rotary means on which opposite end portions of the tape wind, means for maintaining the intermediate portion of the tape in the form of a loop for receiving the hand, said tape including an inner inelastic member winding on the rotary means and an outer flexible elastic sleeve enclosing said member.

BERNARD O. BAIRD.
KENNETH H. BOWEN.
ADAM C. DAVIS, Jr.